(12) United States Patent
Kobayashi et al.

(10) Patent No.: US 10,770,946 B2
(45) Date of Patent: Sep. 8, 2020

(54) STATOR HAVING SEAL MEMBER, AND MOTOR

(71) Applicant: FANUC CORPORATION, Yamanashi (JP)

(72) Inventors: Kouji Kobayashi, Yamanashi (JP); Takeshi Tamaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 215 days.

(21) Appl. No.: 15/351,559

(22) Filed: Nov. 15, 2016

(65) Prior Publication Data

US 2017/0141640 A1    May 18, 2017

(30) Foreign Application Priority Data

Nov. 17, 2015   (JP) .................. 2015-224816

(51) Int. Cl.
*H02K 5/10*         (2006.01)
*H02K 5/124*        (2006.01)

(52) U.S. Cl.
CPC ............... *H02K 5/10* (2013.01); *H02K 5/124* (2013.01)

(58) Field of Classification Search
CPC ...... H02K 17/16; H02K 17/165; H02K 17/18; H02K 17/185; H02K 17/20; H02K 17/205; H02K 5/1285; H02K 5/132; H02K 5/136; H02K 5/10; H02K 5/145; H02K 310/211; H02K 310/212; H02N 1/00; H02N 1/002–008; H02N 1/08; H02N 1/06
USPC ..................... 310/87–90, 308–310
See application file for complete search history.

(56) References Cited

U.S. PATENT DOCUMENTS

| 4,972,109 | A | * | 11/1990 | Kakizaki | H02K 37/14 310/49.12 |
| 6,053,705 | A | * | 4/2000 | Schob | A61M 1/101 417/356 |
| 7,586,227 | B2 | * | 9/2009 | Spaggiari | H02K 5/10 310/85 |
| 2013/0248277 | A1 | * | 9/2013 | Hagiwara | B62D 5/0406 180/443 |

FOREIGN PATENT DOCUMENTS

| CN | 103368311 A | 10/2013 |
| JP | 5925744 U1 | 2/1984 |
| JP | 628352 U1 | 1/1987 |
| JP | 6319655 Y2 | 6/1988 |

(Continued)

OTHER PUBLICATIONS

English Abstract and Machine Translation for Japanese Publication No. 2014-039366 A, published Feb. 27, 2014, 10 pgs.

(Continued)

*Primary Examiner* — Bryan R Perez
(74) *Attorney, Agent, or Firm* — Fredrikson & Byron, P.A.

(57) ABSTRACT

A stator includes a first stator part, a second stator part, and an annular seal member. The annular seal member is provided with a plurality of protrusions extending radially outward. A groove part corresponding to the annular seal member, and a plurality of recessed parts, which correspond to the plurality of protrusions of the annular seal member and which are to be connected to the groove part, are formed in at least one of the first stator part and the second stator part.

6 Claims, 9 Drawing Sheets

(56) References Cited

FOREIGN PATENT DOCUMENTS

| | | | |
|---|---|---|---|
| JP | 6178472 | A | 6/1994 |
| JP | 2000283295 | A | 10/2000 |
| JP | 2002372152 | A | 12/2002 |
| JP | 2005240988 | A | 9/2005 |
| JP | 2009285942 | A | 12/2009 |
| JP | 201439366 | A | 2/2014 |

OTHER PUBLICATIONS

English Abstract and Machine Translation for Japanese Publication No. 2005-240988, A, published Sep. 8, 2005, 16 pgs.
English Abstract and Machine Translation for Japanese Publication No. 2000-283295 A, published Oct. 13, 2000, 8 pgs.
English Machine Translation for Japanese Publication No. 62-008352 U1, published Jan. 19, 1987, 4 pgs.
English Machine Translation for Japanese Publication No. 59-025744 U1, published Feb. 17, 1984, 4 pgs.
English Abstract and Machine Translation for Chinese Publication No. 103368311 A, published Oct. 23, 2013, 25 pgs.
English Machine Translation of Japanese Publication No. S59-025744 U, published Feb. 17, 1984, 7 pgs (which is a counterpart publication of Japanese Publication No. S63-019655 Y2, published Jun. 1, 1988).
English Abstract and Machine Translation for Japanese Publication No. 06-178472 A, published Jun. 24, 1994, 10 pgs.
English Abstract and Machine Translation for Japanese Publication No. 2009-285942 A, published Dec. 10, 2009, 9 pgs.
English Abstract and Machine Translation for Japanese Publication No. 2002-372152 A, published Dec. 26, 2002 6 pgs.

\* cited by examiner

STATOR HAVING SEAL MEMBER, AND MOTOR

BACKGROUND OF THE INVENTION

1. Field of the Invention

The present invention relates to a stator provided with a seal member, and a motor including such a stator.

2. Description of the Related Art

Figure 11:
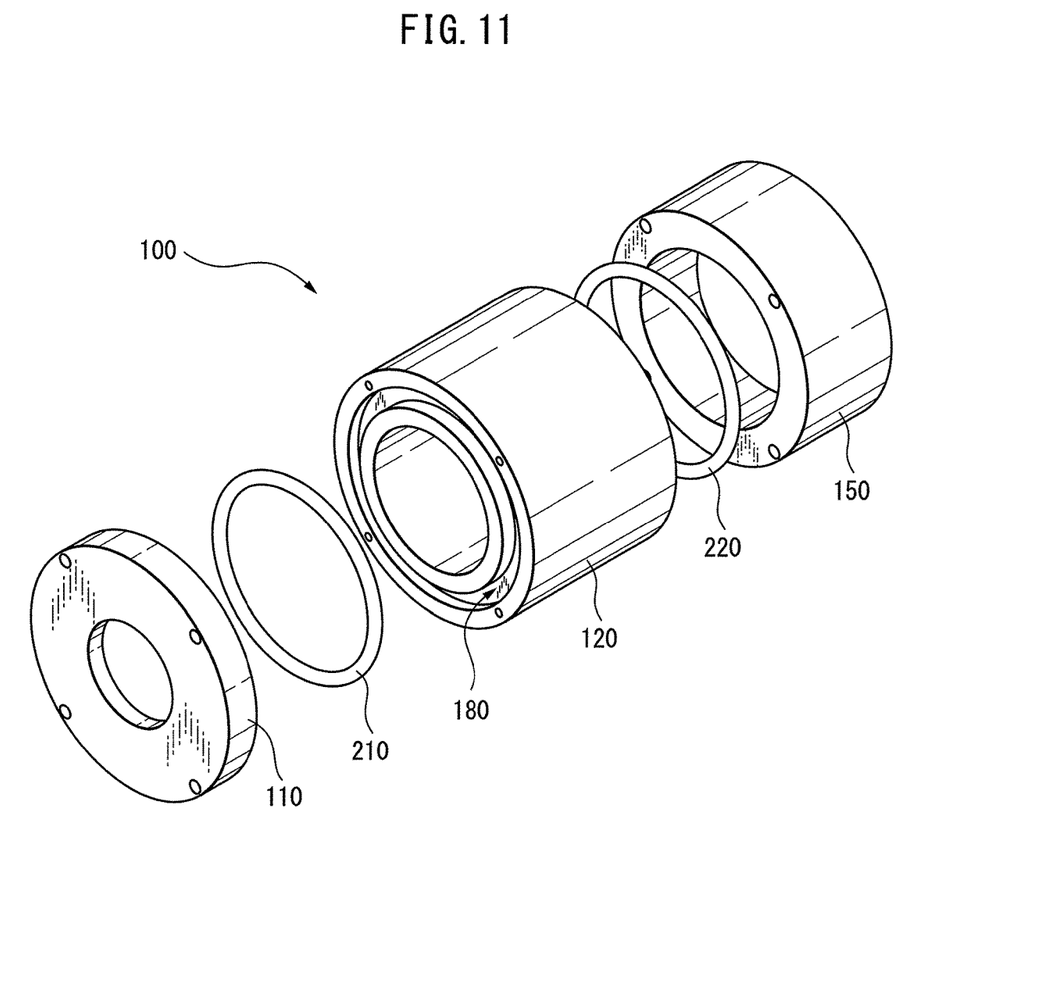
FIG. 11 is an exploded perspective view of a stator in conventional technology.

Fully-closed motors in conventional technology are provided with a rotor and a stator. In order to improve a waterproof property, such a stator of each fully-closed motor has one or a plurality of seal members. FIG. 11 is an exploded perspective view of a stator in conventional technology disclosed in, for example, Japanese Unexamined Patent Publication (Kokai) No. 06-178472. As shown in FIG. 11, a stator 100 has a first stator part 110, a second stator part 120, and a first seal member 210, for example, an O-ring, a packing, etc. sandwiched between the first stator part 110 and the second stator part 120. Further, a detector 150 is attached to an end of the stator 100 via a second seal member 220.

SUMMARY OF THE INVENTION

Figure 12A:
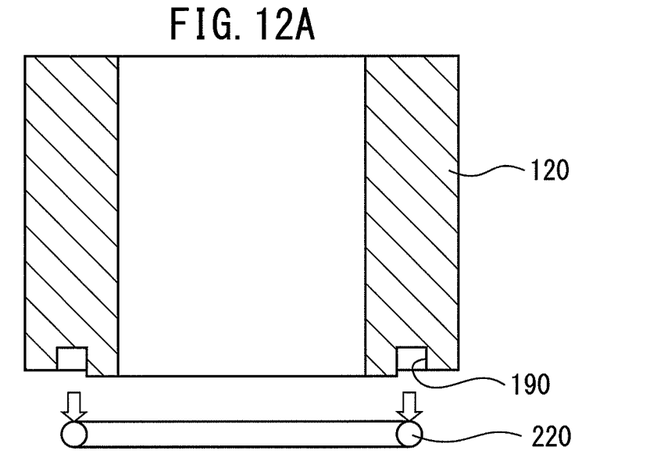
FIG. 12A is a first partially enlarged sectional view of a stator in conventional technology.
Figure 12B:
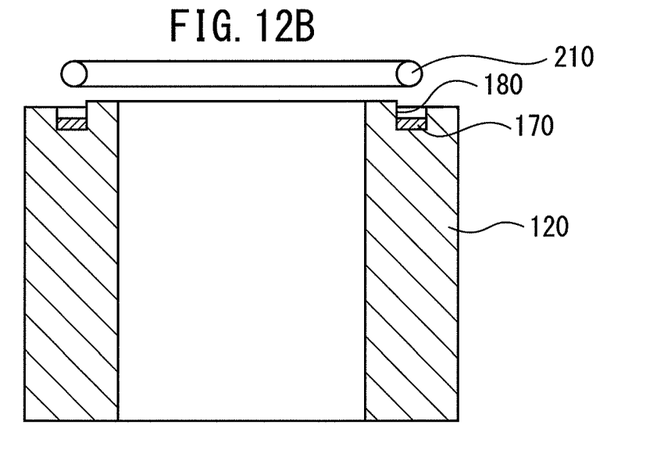
FIG. 12B is a second partially enlarged sectional view of a stator in conventional technology.
Figure 12C:
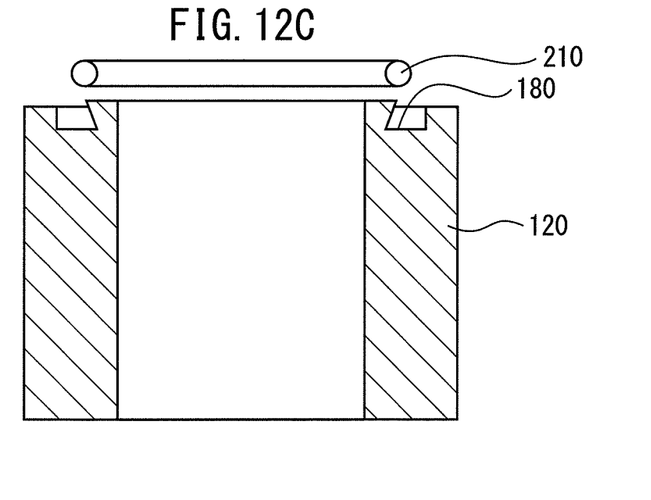
FIG. 12C is a third partially enlarged sectional view of a stator in conventional technology.

FIGS. 12A to 12C are partially enlarged sectional views of stators in conventional technology. In FIG. 12A, the second seal member 220 is inserted into an annular groove part 190 formed in the bottom end of the second stator part 120 of a stator. However, simply inserting the second seal member 220 into the annular groove part 190 cannot prevent the second seal member 220 from being accidentally detached before installation of a detector 150.

In FIG. 12B, the first seal member 210 is inserted into an annular groove part 180 formed in the top end of the second stator part 120 of the stator. As shown in FIG. 12B, the bottom of the annular groove part 180 is previously coated with an adhesive agent 170. However, if the amount of the adhesive agent 170 is excessive, when the first seal member 210 is inserted, the adhesive agent 170 protrudes from the annular groove part 180. Thus, the adhesive agent 170 needs to be wiped off.

In FIG. 12C, the annular groove part 180 formed in the top end of the second stator part 120 of the stator has a tapered shape in section, to prevent the first seal member 210 from being accidentally detached. However, when a motor is small, it is extremely difficult to precisely machine the annular groove part 180 as shown in FIG. 12C. Note that the problems described with reference to FIGS. 12A to 12C may also occur in the other end of the second stator part, and the first stator part.

The present invention was made in light of the circumstances described above and has an object to provide a stator, in which a seal member is prevented from being easily detached without using an adhesive agent, and a motor including such a stator.

To achieve the above object, according to a first aspect of the invention, there is provided a stator including a first stator part, a second stator part incorporated in the first stator part, and an annular seal member sandwiched between the first stator part and the second stator part. The annular seal member is provided with a plurality of protrusions extending radially outward. A groove part corresponding to the annular seal member, and a plurality of recessed parts, which correspond to the plurality of protrusions of the annular seal member and which are to be connected to the groove part, are formed in at least one of the first stator part and the second stator part.

According to a second aspect of the invention, in the stator according to the first aspect of the invention, the dimensions of each recessed part are smaller than the dimensions of each protrusion.

According to a third aspect of the invention, in the stator according to the first or second aspect of the invention, the length of the groove part, which corresponds to a distance between two adjacent recessed parts, is different from the length of the annular seal member, which corresponds to a distance between two adjacent protrusions.

According to a fourth aspect of the invention, in the stator according to any of the first to third aspects of the invention, the annular seal member is sandwiched between and pressed by the first stator part and the second stator part, and is positioned between two walls defining the groove part.

According to a fifth aspect of the invention, there is provided a motor including the stator according to any of the first to fourth aspects of the invention and a rotor engaged with the stator.

These objects, features, and advantages of the present invention and other objects, features, and advantages will become further clear from the detailed description of typical embodiments illustrated in the appended drawings.

DETAILED DESCRIPTION

Embodiments of the present invention will be described below with reference to the accompanying drawings. In the following figures, similar members are designated with the same reference numerals. These figures are properly modified in scale to assist the understanding thereof.

Figure 1:
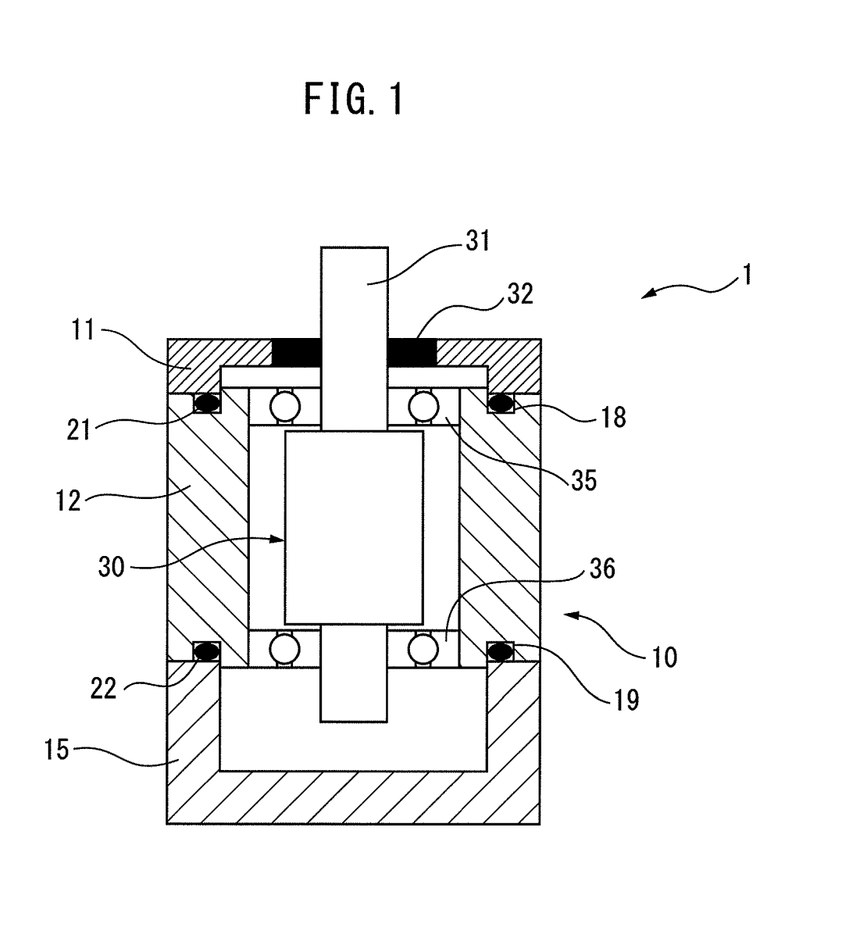
FIG. 1 is a sectional view of a motor according to the present invention.

FIG. 1 is a sectional view of a motor according to the present invention. As shown in FIG. 1, a motor 1 includes a stator 10 and a rotor 30 rotatably supported by the stator 10.

The stator 10 has a first stator part 11, a second stator part 12, and a first seal member 21, such as an O-ring, a packing, etc., sandwiched between the first stator part 11 and the second stator part 12. Further, a detector 15 is attached to an end of the stator 10 via a second seal member 22. As can be seen from FIG. 1, the first stator part 11, the second stator part 12, and the detector 15 are coaxially arranged.

A first bearing 35 and a second bearing 36 are arranged on the inner peripheral surface of the second stator part 12. A shaft part 31 penetrating through the rotor 30 is rotatably supported by the first bearing 35 and the second bearing 36 in the second stator part 12. An oil seal 32 is disposed around the shaft part 31 at an edge of the first stator part 11.

Figure 2:
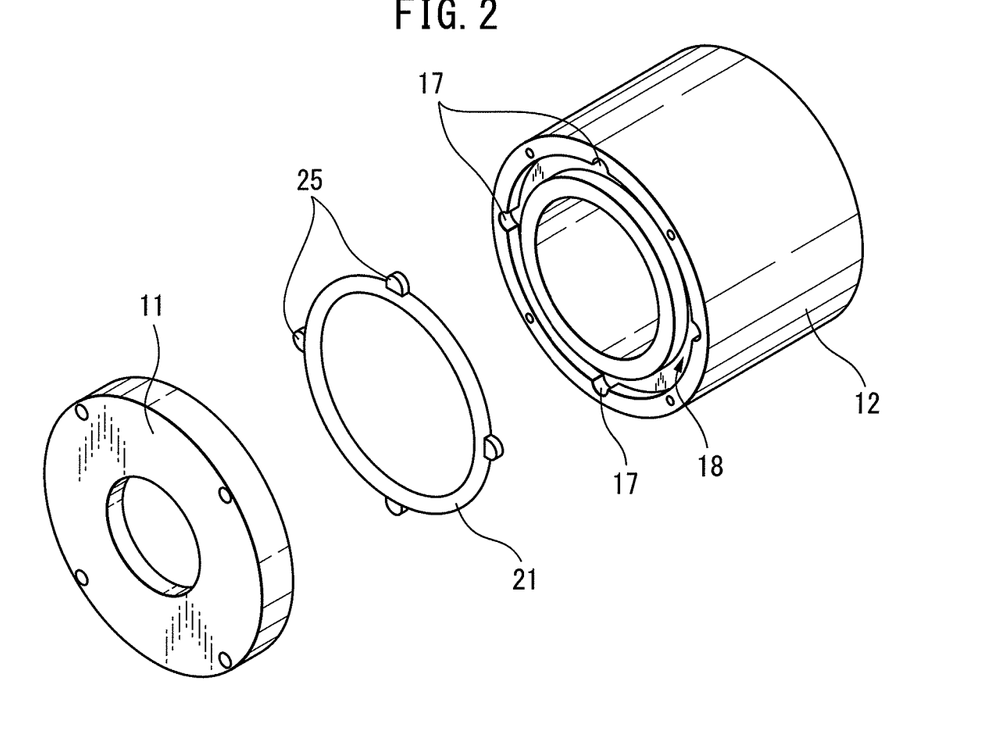
FIG. 2 is a partially exploded perspective view of a stator.

FIG. 2 is a partially exploded perspective view of a stator. As can be seen from FIGS. 1 and 2, an annular groove part 18 coaxial with the second stator part 12 is formed at an end of the second stator part 12. At least a part of the first seal member 21 is inserted into the annular groove part 18 of the second stator part 12. Subsequently, the first stator part 11 closes the end of the second stator part 12. This causes the first stator part 11 and the second stator part 12 to sandwich the first seal member 21 therebetween.

Likewise, as can be seen from FIG. 1, an annular groove part 19 is formed in the other end of the second stator part 12, and at least a part of the second seal member 22 is inserted into the annular groove part 19. Subsequently, the detector 15 closes the other end of the second stator part 12, so that the second seal member 22 is sandwiched between the second stator part 12 and the detector 15.

As shown in FIG. 2, the first seal member 21 according to the present invention is an annular member, and a plurality of protrusions 25 extending radially outward are provided thereon. It is preferable that the protrusions 25 and the first seal member 21 are made of the same material and that the first seal member 21 is integral with the protrusions 25.

Further, a plurality of recessed parts 17 are formed at an end of the second stator part 12. The recessed parts 17 have a shape corresponding to the shape of the protrusions 25 of the first seal member 21, and are formed at positions corresponding to the positions of the protrusions 25. The recessed parts 17 are connected to the annular groove part 18.

Figure 3:
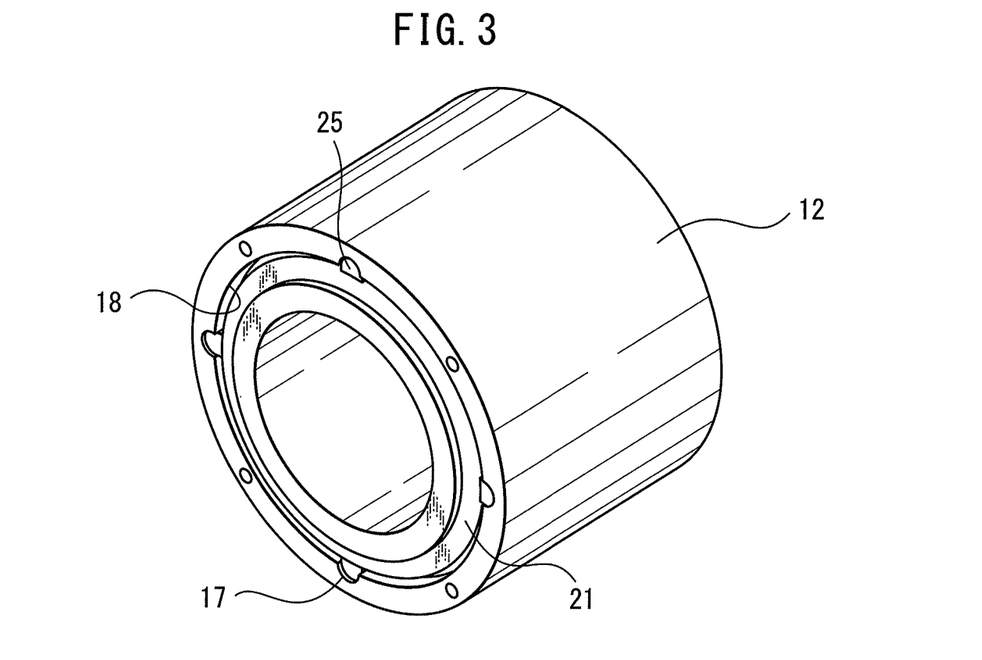
FIG. 3 is a perspective view of a second stator part.
Figure 4:
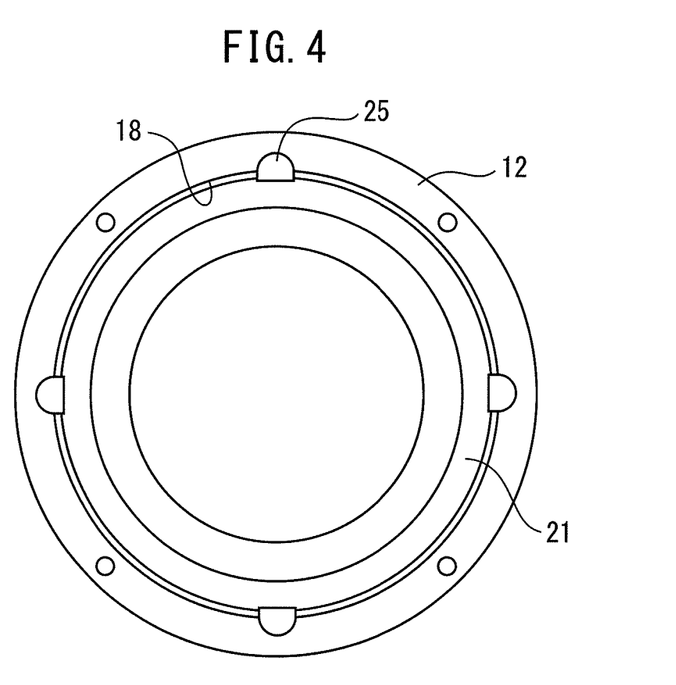
FIG. 4 is an end view of the second stator part.

FIG. 3 is a perspective view of a second stator part. FIG. 4 is an end view of the second stator part. As shown in FIGS. 3 and 4, when the first seal member 21 is incorporated in the annular groove part 18 of the second stator part 12, at least a part of each protrusion 25 of the first seal member 21 is forced to be inserted into the corresponding recessed part 17 of the annular groove part 18.

Figure 5:
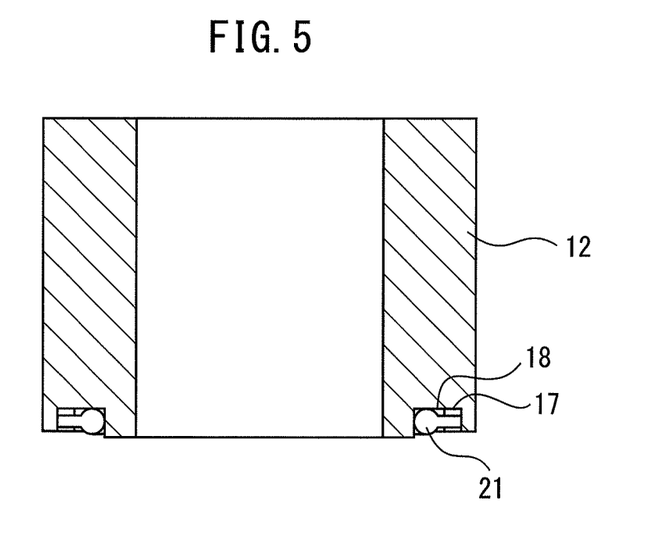
FIG. 5 is a partial sectional view of the second stator part.

In the present invention, the protrusions 25 are inserted into the corresponding recessed parts 17, and accordingly, the first seal member 21 is firmly retained in the second stator part 12. FIG. 5 is a partial sectional view of a second stator part. As shown in FIG. 5, even when an end of the second stator part 12, to which the first seal member 21 is attached, faces downward, the first seal member 21 is not detached from the second stator part 12. Thereafter, the first stator part 11 is attached to the end of the second stator part 12, to sandwich the first seal member 21 between the first stator part 11 and the second stator part 12.

Note that the second seal member 22 has protrusions similar to those of the first seal member 21, and the annular groove part 19 has recessed parts similar to the recessed parts 17. After the second seal member 22 is incorporated in the annular groove part 19, the detector 15 is attached to the other end of the second stator part 12. Thus, the motor 1 shown in FIG. 1 is produced.

Thus, in the present invention, the first seal member 21 and the second seal member 22 are prevented from being easily detached from the second stator part 12. Further, it is not necessary to use an adhesive agent to incorporate the first seal member 21 and the second seal member 22, and accordingly, a process for applying an adhesive agent and a process for wiping off the protruding adhesive agent can be eliminated in the present invention.

Additional recessed parts 17 can be machined in the end of the existing second stator part 12. Thus, the first seal member 21 and the second seal member 22 can be attached to the existing second stator part 12. Further, the annular groove parts 18 and 19 and the recessed parts 17 are only required to have a rectangular shape in section, and accordingly, it is not necessary to produce the annular groove part 18 etc. having a tapered section, which is difficult to be machined.

In the embodiment described above, the annular groove part 18 and its related recessed parts are formed in an end face of the second stator part 12. However, the annular groove part 18 and its related recessed parts may be formed in an end face of the first stator part 11. Alternatively, the annular groove part 18 and its related recessed parts may be formed in both an end face of the first stator part 11 and an end face of the second stator part 12. The same is true in the detector 15.

Further, each protrusion 25 may extend radially inward. In this respect, the recessed parts 17 are formed in accordance with the protrusions 25.

Figure 6A:
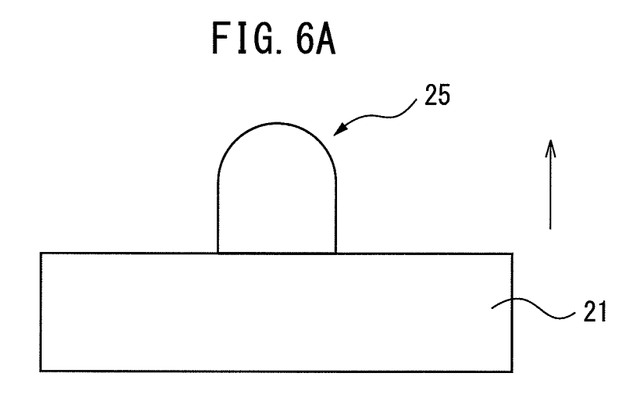
FIG. 6A is a first top view of a protrusion.

In the embodiment described above, each protrusion 25 of the first seal member 21 has a rectangular shape in section. However, as shown in FIG. 6A that is a top view of a protrusion, a part of an oval may constitute the shape of each protrusion 25 in section. Note that the arrow in FIG. 6A designates a radially outward direction of the second stator part 12.

Figure 6B:
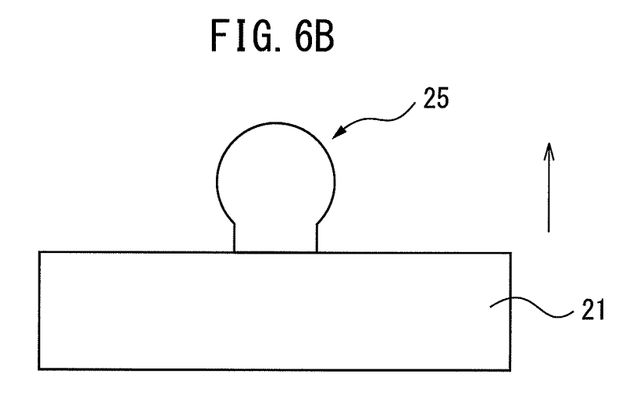
FIG. 6B is a second top view of a protrusion.
Figure 6C:
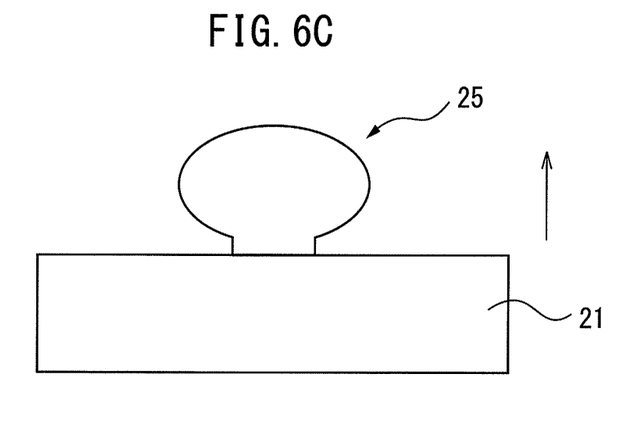
FIG. 6C is a third top view of a protrusion.

Alternatively, as shown in FIGS. 6B and 6C that are top views similar to FIG. 6A, the tip end of each protrusion 25 may have a round shape or an elliptical shape in section. Specifically, in FIGS. 6B and 6C, the tip end of the protrusion 25 is larger than the base end thereof, and accordingly, the first seal member 21 can be effectively prevented from being detached from the second stator part 12. Note that, in FIGS. 6A to 6C and figures that will be described later, the shape of the recessed parts 17 of the annular groove part 18 obviously corresponds to the shape of the protrusions 25. The same is true in the protrusions of the second seal member 22.

Figure 7A:
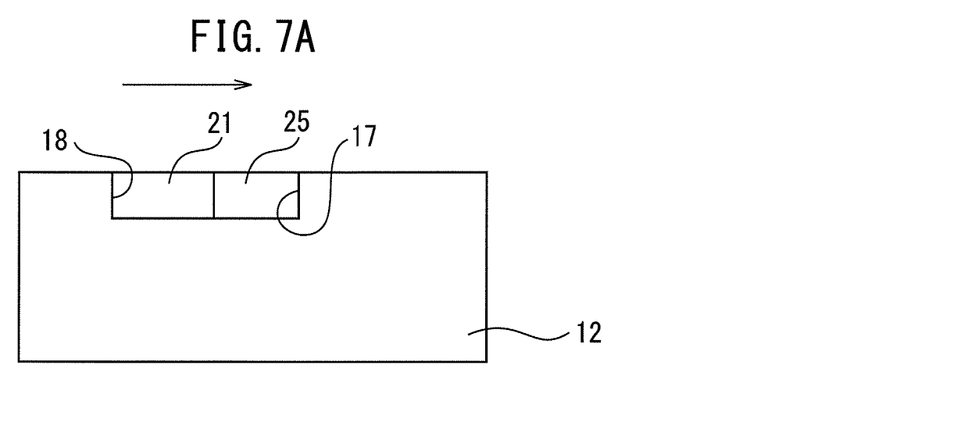
FIG. 7A is a first side view of a protrusion.
Figure 7B:
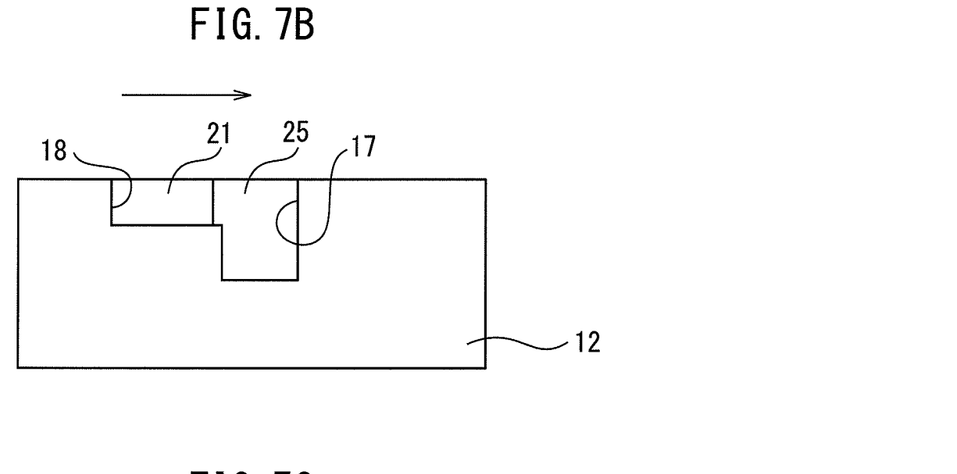
FIG. 7B is a second side view of a protrusion.
Figure 7C:
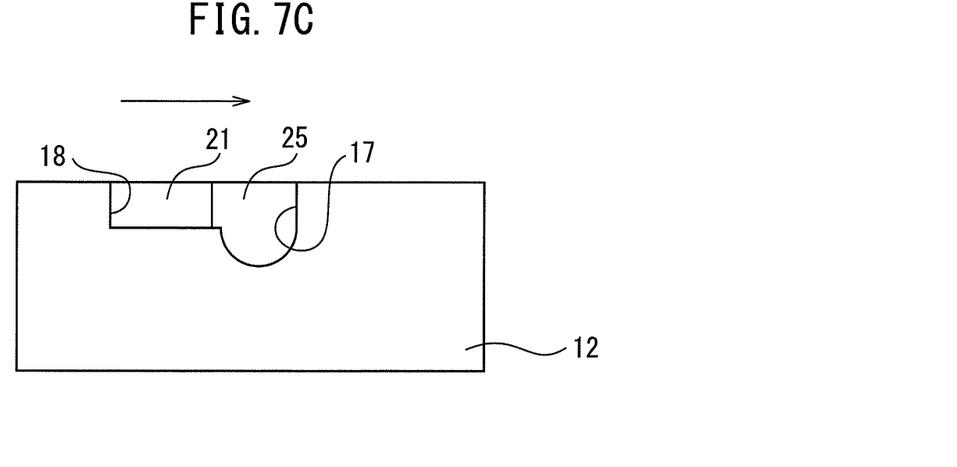
FIG. 7C is a third side view of a protrusion.

FIGS. 7A to 7C are side views of protrusions. The arrows shown in these figures designate a radially outward direction of the second stator part 12. The protrusion 25 shown in FIG. 7A extends only in the radially outward direction from the first seal member 21.

However, the protrusion 25 shown in FIG. 7B extends both in the radially outward direction of the second stator part 12 and in the depth direction of the recessed part 17. This will indicate that the structures shown in FIGS. 7B and 7C can more effectively prevent the first seal member 21 from being detached from the second stator part 12 than the structure shown in FIG. 7A. Note that the same is true in the protrusions of the second seal member 22.

Figure 8A:
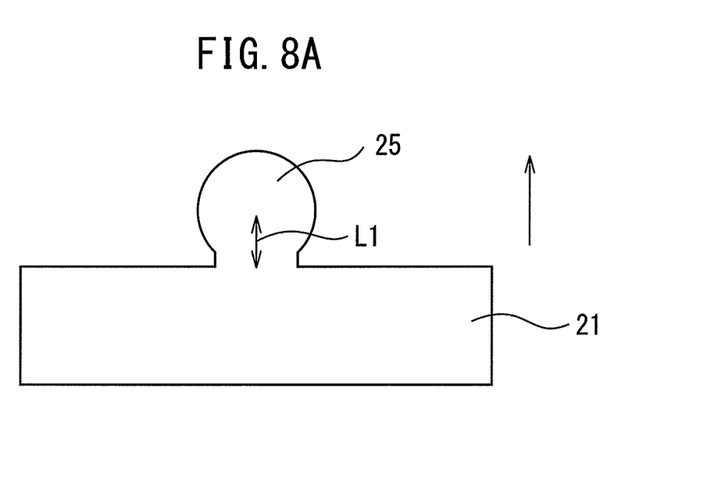
FIG. 8A is an enlarged view of a protrusion.
Figure 8B:
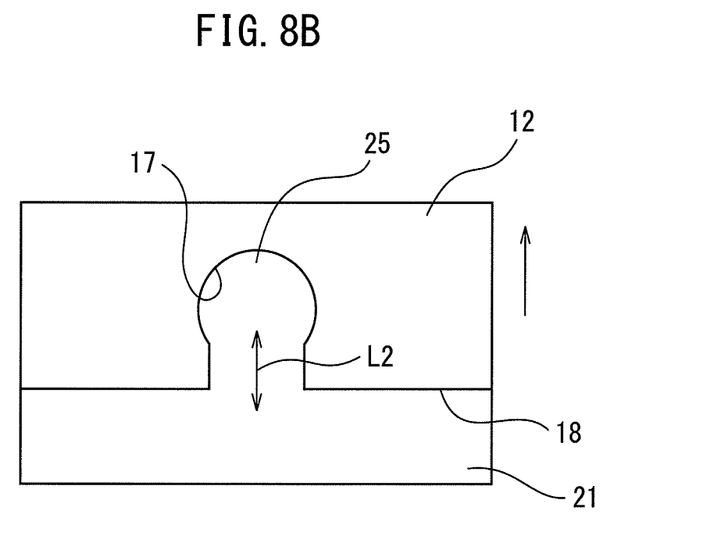
FIG. 8B is a partially enlarged view of a second stator member.

FIG. 8A is an enlarged view of a protrusion, and FIG. 8B is a partially enlarged view of a second stator member. FIGS. 8A and 8B show the protrusion 25 having a tip end, the shape of which is circular in section. Note that the arrows shown in these figures designate radially outward directions of the second stator part 12 and the first seal member 21.

As shown in FIG. 8A, a distance L1 between the center of the circular tip end of the protrusion 25 and the first seal member 21 is relatively short. In contrast, a distance L2 between the center of the recessed part 17 formed in the second stator part 12 and the annular groove part 18 is relatively long. Thus, when the first seal member 21 is attached to the second stator part 12, the protrusion 25 extends radially outward. This will indicate that the first seal member 21 is more firmly attached to the second stator part 12. Note that the same is true in the protrusions of the second seal member 22.

Figure 9A:
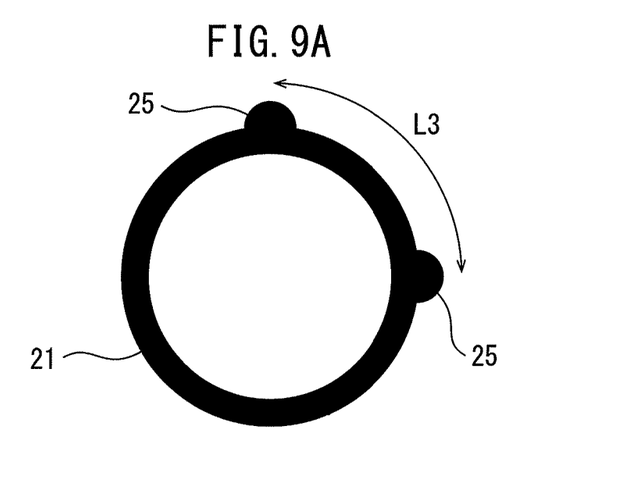
FIG. 9A is a top view of a first seal member.
Figure 9B:
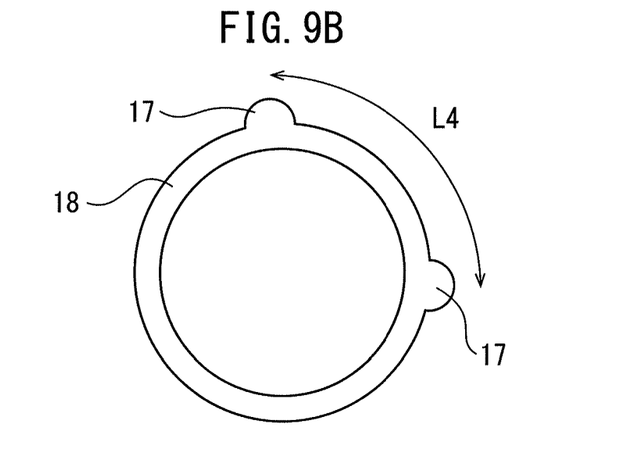
FIG. 9B is a top view of an annular groove part.

FIG. 9A is a top view of a first seal member. In FIG. 9A, the distance between the adjacent protrusions 25 along the first seal member 21 is defined as a distance L3. FIG. 9B is a top view of an annular groove part. The distance between the adjacent recessed parts 17 along the annular groove part 18 in FIG. 9B is defined as a distance L4. The distances L3 and L4 are slightly different from each other, and L3<L4 is preferable. Thus, when the first seal member 21 is attached to the second stator part 12, the first seal member 21 extends in the circumferential direction between the adjacent protrusions 25. This will indicate that the first seal member 21 is firmly attached to the second stator part 12. Note that the same is true in the second seal member 22.

Figure 10:
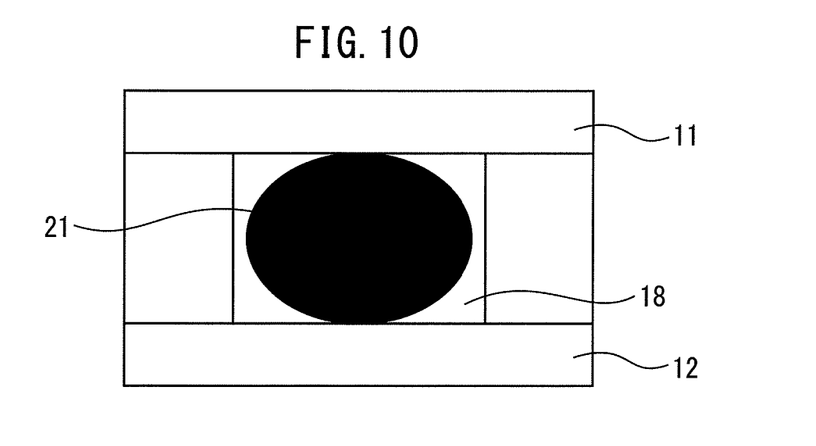
FIG. 10 is a sectional view of a first seal member and its surrounding part.

FIG. 10 is a sectional view of a first seal member and its surrounding parts. In FIG. 10, the first seal member 21 is sandwiched and pressed between and pressed by the first stator part 11 and the second stator part 12. Further, the first seal member 21 is positioned between two walls defining the annular groove part 18. The first seal member 21 is pressed as described above, and accordingly, sealing performance between the first stator part 11 and the second stator part 12 can be enhanced, and the first seal member 21 can be firmly attached to the second stator part 12.

Effect of the Invention

In the first and fifth aspects of the invention, a seal member is inserted into a groove part, and protrusions of the seal member are inserted into recessed parts, and accordingly, the seal member can be firmly secured to prevent the seal member from being easily detached from the stator. Further, it is not necessary to use an adhesive agent, and accordingly, it is not necessary to wipe off the protruding adhesive agent. If recessed parts are added to the groove part of the existing stator part, an annular seal member having protrusions can be adopted.

In the second to fourth aspects of the invention, the annular seal member and the protrusions can respectively be firmly fitted in the groove part and the recessed parts.

The present invention has been described above using exemplary embodiments. However, a person skilled in the art would understand that the aforementioned modifications and various other modifications, omissions, and additions can be made without departing from the scope of the present invention.

What is claimed is:

1. A stator comprising:
a first stator part;
a second stator part incorporated in the first stator part; and
an annular seal member sandwiched between the first stator part and the second stator part, wherein
the annular seal member is provided with a plurality of protrusions extending radially outward, and
a groove part and a plurality of recessed parts formed in at least one of the first stator part and the second stator part, the groove part corresponding to the annular seal member, and the plurality of recessed parts correspond to the plurality of protrusions of the annular seal member, and are connected to the groove part at a radially outward side of one of the first stator part and the second stator part, the groove part and the plurality of recessed parts each has a depth measured in a direction perpendicular to a radial direction wherein the depth of the groove part is uniform and the depth of each of the plurality of recessed parts is greater than the depth of the groove part,
each of the plurality of protrusions of the annular seal has a radially outward extending portion, which extends radially outward of the one of the first stator part and the second stator part, and a depth direction extending portion, which extends in the depth direction of each of the plurality of recessed parts only on the one side of the radially outward extending portion.

2. The stator according to claim 1, wherein the dimensions of each recessed part are smaller than the dimensions of each protrusion.

3. The stator according to claim 1, wherein the length of the groove part, which corresponds to a distance between two adjacent recessed parts, is different from the length of the annular seal member, which corresponds to a distance between two adjacent protrusions.

4. The stator according to claim 1, wherein the annular seal member is sandwiched between and pressed by the first stator part and the second stator part, and is positioned between two walls defining the groove part.

5. A motor comprising the stator according to claim 1 and a rotor engaged with the stator.

6. The stator according to claim 1, wherein a distance between the protrusion and the annular seal member is smaller than a distance between the recessed part and the groove part.

* * * * *